United States Patent Office 3,845,120
Patented Oct. 29, 1974

3,845,120
PRODUCTION OF ACRYLIC ACID BY OXIDATION OF ACROLEIN
Richard Krabetz, Kirchheim, and Heinz Engelbach, Limburgerhof, Germany, assignors to Badische Anilin- & Soda-Fabrik Aktiengesellschaft, Ludwigshafen (Rhine), Germany
No Drawing. Filed Feb. 16, 1970, Ser. No. 11,872
Claims priority, application Germany, Feb. 22, 1969, P 19 08 965.7
Int. Cl. C07c 51/32
U.S. Cl. 260—530 N                                3 Claims

ABSTRACT OF THE DISCLOSURE

Production of acrylic acid by oxidation of acrolein with gas containing oxygen in the gas phase at elevated temperature in the presence of a catalyst which contains (in addition to oxygen) molybdenum, tungsten and vanadium as well as iron and/or nickel and/or manganese and/or copper. The atomic ratio of molybdenum:tungsten:iron/nickel/manganese/copper is 1 to 20:0.01 to 10:1 and the atomic ratio of vanadium:molybdenum is 0.2 to 6:6. Acrylic acid is an important starting material for the production of high polymers.

---

This invention relates to a process for the production of acrylic acid by oxidation of acrolein with a gas containing oxygen.

It is known from Belgian Pat. No. 658,192 that acrylic acid may be obtained by oxidation of acrolein with gas containing oxygen in the presence of catalysts containing molybdenum, tellurium, phosphorus and oxygen. The process has the disadvantage, however, that at the temperature used, tellurium migrates from the catalyst in a short time. The catalyst thus rapidly becomes inactive so that the yield of acrylic acid declines. According to another method which is described in Belgian Pat. No. 610,392 acrolein can be oxidized into acrylic acid in the presence of catalysts containing phosphorus, tungsten, molybdenum and vanadium. It is only at temperatures above 400° C., however, that the process proceeds with good yields. Oxidation of acrolein to acrylic acid in the presence of catalysts is described in other patents. Molybdenum trioxide and basic metals such as cobalt or nickel with additions of boron trioxide or phosphorus pentoxide are used as catalysts according to a process described in U.S. Pat. No. 3,087,964. Metals of Group VIb of the Periodic System with additions such as bismuth, tin, cobalt, vanadium, antimony, nickel, titanium or tungsten, are described as suitable catalysts in British Pat. No. 999,836. Furthermore it is known from U.S. Pat. No. 3,358,020 that catalysts containing iron, molybdenum, vanadium and antimony are suitable. Moreover it is known from British Pat. No. 903,034 that the oxidation of acrolein to acrylic acid will take place in the presence of catalysts which contain molybdenum and one or more than one polyvalent metal such as iron, tungsten, tin or antimony. All catalysts hitherto used, however, have the disadvantage that high space-time yields are not achieved.

It is an object of the invention to provide a process for the production of acrylic acid by the oxidation of acrolein with gas containing oxygen in which a higher space-time yield is obtained than in prior methods. Another object of the invention is to provide a process in which yields of acrylic acid of more than 90% are achieved at practically quantitative conversions of acrolein. A further object of the invention is to provide a process in which the catalysts remain active for long periods and which can be carried out at fairly low temperatures.

In accordance with this invention these and other objects and advantages are obtained in a process for the production of acrylic acid by the oxidation of acrolein with gas containing oxygen in the gas phase at elevated temperature in the presence of a catalyst which contains (in addition to oxygen) molybdenum, tungsten and vanadium as well as iron and/or nickel and/or manganese and/or copper, wherein a catalyst is used in which the atomic ratio of molybdenum:tungsten:iron/nickel/manganese/copper is 1 to 20:0.01 to 10:1 and the atomic ratio of vanadium:molybdenum is 0.2 to 6:6.

Pure acrolein may be used for the reaction but it is preferred to use a gas containing acrolein such as is obtained in the production of acrolein by the oxidation of propylene. The gas advantageously has a content of acrolein of from 1 to 20% by volume. Particularly good results are achieved when the gas contains from 2 to 10% by volume of acrolein. In addition to acrolein, the gas may contain for example acrylic acid, acetic acid, formamide, acetaldehyde and small amounts, for example up to 3% by volume, of hydrocarbons such as propylene, propane, butylene or butane. Other gases such as nitrogen, carbon dioxide, steam (for example up to 70% by volume) and oxygen (for example up to 20% by volume) may also be present.

The gas containing oxygen used in general has an oxygen content of 10 to 30% by volume, advantageously 15 to 25% by volume. It is particularly advantageous to use air. The gas may contain inert constituents such as nitrogen, carbon dioxide or argon, in addition to oxygen.

It is advantageous to use 0.5 to 10, particularly 0.5 to 3, parts by volume of oxygen to 1 part of gaseous acrolein. When using gases containing acrolein (prepared for example by the oxidation of propylene) as starting material, any oxygen present in these gases should be taken into account.

The reaction is advantageously carried out at temperatures of from 220° to 450° C. Particularly good results are obtained by using temperatures of from 240° to 340° C. Bath temperatures of from 200° to 400° C., preferably from 220° to 280° C., are generally used for the reactions. Oxidation is carried out in the gas phase and the residence time of the starting materials at the catalyst should be from 0.1 to 20 seconds, preferably from 1 to 10 seconds.

The atomic ratio of molybdenum:tungsten:iron/nickel/manganese/copper is 1 to 20:0.01 to 10:1 and the atomic ratio of vanadium:molybdenum is 0.2 to 6:6. Preferred catalysts contain molybdenum:tungsten:iron/nickel/manganese/copper in an atomic ratio of 2 to 10:0.1 to 2:1. The preferred catalysts also contain vanadium in an atomic ratio vanadium:molybdenum of 0.5 to 4:6. Particularly good results are obtained by using a catalyst containing vanadium, molybdenum, tungsten and iron in which the atomic ratio of molybdenum:tungsten:iron is 1 to 20:0.01 to 10:1, preferably 2 to 10:0.1 to 2:1 and the atomic ratio of vanadium to molybdenum is 0.2 to 6:6, preferably 0.5 to 4:6. The said metals may be present in the catalyst as a mixture of oxides or as compounds of these oxides with each other.

The catalysts may be prepared for example by allowing aqueous solutions of salts of iron and/or nickel and/or manganese and/or copper which are readily converted into the oxides upon heating, for example chlorides or sulfates, to flow into an aqueous solution of ammonium molybdate, ammonium tungstate and ammonium vanadate. The precipitation is advantageously carried out in the presence of nitrogen bases such as ammonia, trimethylamine, pyridine or salts thereof at elevated temperature, for example 50° to 100° C. It has proved to be specially advantageous to maintain a pH of from 4 to 0.5, particularly from 3 to 1.0 during the precipitation. A precipitate separates and this is washed with water and dried for example for ten to fifteen hours at 110° to 130° C. and then heated advantageously for three to twenty hours in a stream of air at 200° to 700° C., preferably from 350° to 450° C. According to another advantageous method, the catalyst may be prepared by mixing oxides of the metals or readily decomposable salts of the metals such as acetates, formates, oxalates, nitrates or ammonium salts of oxyacids of the metals, if necessary converting the salts into the oxides, and then heating the resulting mixture, if desired in a stream of air, advantageously in a stream of nitrogen, at temperatures of for example from 300° to 800° C. In a preferred method of preparing the catalysts tungstic acid, molybdic acid and vanadium pentoxide or ammonium vanadate are introduced at elevated temperature, for example at 20° to 80° C., into aqueous ammonia solution. The solution obtained is evaporated and the residue if necessary dried at elevated temperature, advantageously at temperatures of from 90° to 140° C., and comminuted. The residue is kneaded with the addition of water and then further kneaded with the nitrates of iron and/or nickel and/or manganese and/or copper, with or without the addition of water in portions. The kneaded material is then dried and thereafter calcined at a rising temperature of from 150° to 450° C., preferably from 200° to 400° C. The calcination may be carried out in the presence of air, although it is preferably carried out in the presence of an inert gas such as steam, argon and particularly nitrogen. In a variant of the preferred embodiment, the evaporated residue of the solution of molybdenum, tungsten and vanadium salts is suspended in water, an aqueous solution of metal nitrates is added and the mixture is advantageously evaporated to dryness, kneaded for example for three to five hours and then dried. The dried residue is then calcined at the temperatures specified above. The catalysts may be applied to carriers such as silicic acid, aluminum oxide or silicates. The supported catalysts advantageously contain 90 to 10%, preferably 70 to 50%, by weight of active catalyst material with reference to the sum of catalyst and carrier.

The process according to this invention may be carried out for example by arranging a catalyst of the said composition as a fixed bed in a reaction tube and passing a mixture of acrolein and gas containing oxygen in the said ratio over the catalyst at the said temperature and with the said residence times. The hot reaction gas obtained may be cooled rapidly and washed, for example with water, the acrylic acid dissolving in the water. Unoxidized acrolein may be deposited, separated from the acrylic acid and returned to the reaction. It is advantageous to recycle the wash water to that acrylic acid accumulates therein. Acrylic acid is then advantageously extracted with an organic solvent such as ethyl acetate from the enriched aqueous solution. After the aqueous phase has been separated, for example by decantation, the acrylic acid is isolated from the extract by distillation.

The following examples illustrate the invention.

EXAMPLE 1

250 parts of tungstic acid and 920 parts of molybdic acid (94% by weight of molybdenum trioxide) are added in portions in the sequence given to 2,000 parts by volume of a 15% by weight aqueous ammonia solution at 25° to 70° C. 117 parts of ammonium vanadate is added to the solution which may still contain undissolved constituents. The solution obtained is evaporated and dried for about twelve hours at 110° C. The dried material is kneaded for one hour with an addition of water and after 606 parts of iron(III) nitrate (9 moles of water of crystallization) has been added to whole is kneaded for another three hours while adding water in portions. The material thus obtained is dried for twelve hours, calcined for two hours at 100° C., two hours at 300° C. and four hours at 360° C. in a stream of nitrogen, and then broken down. 2% by weight of graphite with reference to the catalyst material is added and the mixture is pressed into pellets having the dimensions 3 mm. x 3 mm.

50 parts by volume of the catalyst prepared in this way is arranged as a fixed bed in a reaction tube heated by a melt of mixed alkali metal nitrates. A mixture of 3.1 mole percent of acrolein, 0.4 mole percent of propylene, 0.48 mole percent of acrylic acid and acetic acid, 5.5 mole percent of oxygen and 45 mole percent of nitrogen together with 43 mole percent of steam and minor amounts of oxidation products of propylene such as are formed in the production of acrolein is passed over the catalyst. The saltpeter bath is kept at a temperature of 250° C. According to gas chromatographic analysis, a conversion of 99 mole percent is achieved with reference to acrolein used. The yield of acrylic acid is 91 mole percent.

The above procedure is followed but 25 parts by volume of the catalyst is used and the temperature is kept at 245° C. Gas chromatographic analysis indicates a conversion of 98.5 mole percent of acrolein, a yield of 90% of acrylic acid being achieved.

COMPARATIVE EXAMPLE

The procedure described in Example 1 is followed but no ammonium vanadate is added. At 230° C. a conversion of 94 mole percent and a yield of 85 mole percent are achieved with 50 parts by volume of the catalyst thus prepared. At 245° C. a conversion of 89 mole percent of acrolein and a yield of 83% of acrylic acid are obtained with 25 parts by volume of the catalyst.

COMPARATIVE EXAMPLE 42.4 parts of ammonium molybdate, 7.0 parts of ammonium vanadate and 6.1 parts of ammonium tungstate are dissolved separately in water and the aqueous solutions are combined. The suspension thus obtained is dried and powdered. Tablets are pressed from the powder and these are calcined for five hours at 400° C.

50 parts by volume of the catalyst prepared in this way is arranged as a fixed bed in a reaction tube which is heated by a melt of mixed alkali metal nitrates. A mixture of 3.1 mole percent of acrolein, 0.4 mole percent of propylene, 0.48 mole percent of acrylic acid and acetic acid, 5.5 mole percent of oxygen, 45 mole percent of nitrogen and 43 mole percent of steam as well as minor amounts of oxidation products of propylene such as occur in the production of acrolein, is passed over the catalyst. A temperature of 230° C. is maintained in the salt-peter bath. According to gas chromatographic analysis a conversion of 55 mole percent with reference to acrolein used is achieved and a yield of acrylic acid of 43 mole percent.

If the reaction temperature is raised to 250° C., a conversion of 90% with reference to the acrolein used and a yield of acrylic acid of 69 mole percent are achieved.

EXAMPLES 2 TO 8

Molybdenum/tungsten/vanadium/iron catalysts which have been prepared according to Example 1 and in which the atomic ratio is varied are installed in an amount of 50 parts by volume in a reactor (2) located downstream of a reactor (1). Reactor (1) contains 50 parts by volume of an oxidation catalyst for the oxidation of propylene to acrolein. A mixture of 3,300 parts by volume of propylene, 40,000 parts by volume of air and 18,700 parts by volume of steam is passed into the first reactor. The temperature of the first reactor is controlled so that propylene is converted to a gas mixture containing acrolein which has the composition given in Example 1. The gas mixture is passed through reactor (2) and the bath temperature is adjusted to that specified in the examples in each case. The conversions and yields (with reference to the propylene passed into reactor (1)) which are given in the table are achieved:

The following abbreviations are used in the table:
Ex.=Example No.
Mo:W:V:Fe=atomic ratio Mo:W:V:Fe in each catalyst used
Temp.=bath temperature of reactor (2) in ° C.
Conv.=conversion of propylene in mole percent
AcrA=acrylic acid
Ace=acetic acid
Mal=maleic acid
RAc=residual acrolein

TABLE

| Ex. | Mo:W:V:Fe | Temp. | Conv. | Yields in mole percent | | | | |
|---|---|---|---|---|---|---|---|---|
| | | | | AcrA | Ace | Mal | RAc | CO/CO$_2$ |
| 2 | 6:1:1:1.75 | 240 | 95.2 | 62.9 | 4.3 | 5.7 | 0.1 | 17.3 |
| 3 | 6:1:1:1.5 | 240 | 95 | 65 | 3.9 | | 1.0 | 18.5 |
| 4 | 6:1:1:1.25 | 241 | 95.1 | 62.6 | 6.2 | 7.3 | 1.8 | 17.2 |
| 5 | 6:1:1:1 | 240 | 95 | 55 | | | 8.0 | |
| 6 | 6:1:1:1.5 | 230-240 | 97.2 | 64.9 | 6.1 | | 1.2 | 20 |
| 7 | 6:1:2:1.5 | 230-240 | 97.2 | 65.0 | 7.2 | | 1.8 | 22.1 |
| 8 | 6:1:3:1.5 | 230-240 | 97.2 | 60.6 | 4.0 | | 2.6 | 26.2 |

EXAMPLES 9 TO 12

The procedure described in Examples 2 to 8 is followed and the catalysts specified in the following table are used with the compositions specified and with the stated bath temperatures. The conversions and yields indicated are achieved.

The following abbreviations are used:
Ex.=Example No.
Composition=composition of catalyst apart from oxygen
BT=bath temperature in ° C.
Co.=conversion in mole percent
AcrA=acrylic acid
Ace=acetic acid
RAc=residual acrolein

TABLE

| Ex. | Composition | Atomic ratio | BT | Co. | Yield in mole percent | | |
|---|---|---|---|---|---|---|---|
| | | | | | AcrA | Ace | RAc |
| 9 | Mo:W:V:Mn | 6:1:1.5:1.5 | 270 | 93 | 52 | 4.8 | 5 |
| 10 | Mo:W:V:Ni | 6:1:1.5:1.5 | 270 | 93 | 47 | 3.7 | 11 |
| 11 | Mo:W:V:Mn:Cu | 6:1:1.5:0.75:0.75 | 270 | 93 | 55 | 12.5 | 0.5 |
| 12 | Mo:W:V:Ni:Cu | 6:1:1.5:0.75:0.75 | 270 | 93 | 63.3 | 5.5 | 2 |

We claim:
1. A process for the production of acrylic acid which comprises oxidizing acrolein with a gas containing oxygen in the gas phase at elevated temperature and in the presence of a catalyst which, in addition to oxygen, consists essentially of (a) molybdenum, (b) tungsten, (c) vanadium and (d) a member selected from the group consisting of copper:manganese in an atomic ratio on the order of 1:1 and copper:nickel in an atomic ratio on the order of 1:1, and wherein the atomic ratio of (a):(b):(d) is 1 to 20:0.01 to 10:1 and the atomic ratio of vanadium:molybdenum is 0.2 to 6:6.

2. A process as claimed in Claim 1 wherein the catalyst, in addition to oxygen, consists essentially of molybdenum, tungsten, vanadium and copper with manganese and in which the atomic ratio of copper:manganese is about 1:1.

3. A process as claimed in Claim 1 wherein the catalyst, in addition to oxygen, consists essentially of molybdenum, tungsten, vanadium, copper and nickel and in which the atomic ratio of copper:nickel is about 1:1.

References Cited

UNITED STATES PATENTS

| 3,579,574 | 5/1971 | Van der Meer | 260—530 X |
| 3,595,911 | 7/1971 | Ball | 260—530 N X |
| 3,644,509 | 2/1972 | Allen | 260—530 X |
| 3,405,172 | 10/1968 | Brown et al. | 260—533 N |
| 3,435,069 | 3/1969 | Bethell et al. | 260—533 N |
| 3,527,797 | 9/1970 | Krabetz et al. | 260—533 N |

FOREIGN PATENTS

| 1,520,089 | 4/1968 | France | 260—530 X |
| 1,924,496 | 11/1969 | West Germany | 260—530 X |

LORRAINE A. WEINBERGER, Primary Examiner

R. D. KELLY, Assistant Examiner

U.S. Cl. X.R.

252—456, 464, 467, 470